United States Patent

[11] 3,610,171

| [72] | Inventor | Robert Soman |
| | | Warren, Ohio |
| [21] | Appl. No. | 840,431 |
| [22] | Filed | July 9, 1969 |
| [45] | Patented | Oct. 5, 1971 |
| [73] | Assignee | Wean Industries, Inc. |
| | | Youngstown, Ohio |

[54] LIFT TABLE ASSEMBLY FOR A WELDING PRESS
8 Claims, 6 Drawing Figs.

[52] U.S. Cl. .................................................. 108/20,
108/147, 72/450
[51] Int. Cl. ........................................................ A47b 9/00
[50] Field of Search............................................ 312/312,
25, 272; 74/99, 25; 100/280, 281, 282, 214, 288;
72/450, 499, 452; 254/8.2, 8.4, 8.6, 122, 124;
228/44; 108/20, 145, 147

[56] References Cited
UNITED STATES PATENTS

| 1,196,055 | 8/1916 | Westinghouse | 74/99 X |
| 2,183,200 | 12/1939 | Miele | 312/272 |
| 2,754,806 | 7/1956 | Funston | 74/25 X |
| 2,850,344 | 9/1958 | Cook | 312/277 X |
| 3,001,741 | 9/1961 | Rumsey | 74/99 X |
| 3,415,586 | 12/1968 | Hammond | 108/147 X |

*Primary Examiner*—Francis K. Zugel
*Assistant Examiner*—Peter A. Aschenbrenner
*Attorney*—Williams and Kreske ABSTRACT: A self-contained, portable lift table assembly adapted to form part of a welding press. Such assembly includes a base structure with upstanding walls and a top structure overlying the base structure and vertically movable relative thereto. Link means extend between the base and top structures to effect movement aforesaid of the latter and guide means are in part provided by the base structure and in part provided by the top structure to guide such top structure movement. The link means and the guide means are enclosed within the base structure walls as well as means for effecting movement of the link means and consequent movement of the top structure. A refinement of the invention provides means for varying the total amount of movement of the top structure without changing one of the extreme positions between which the top structure is moved.

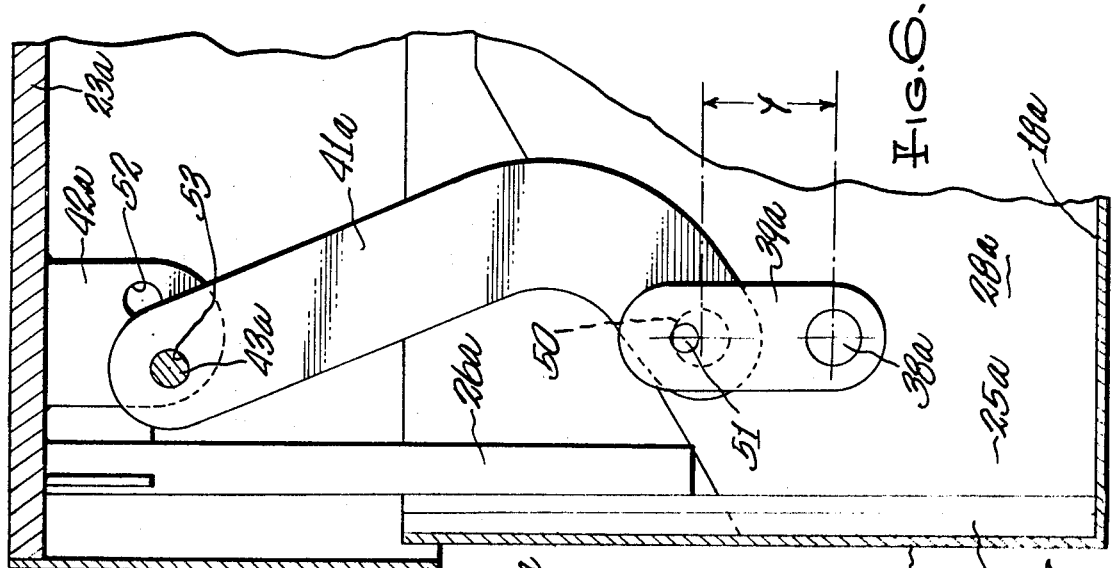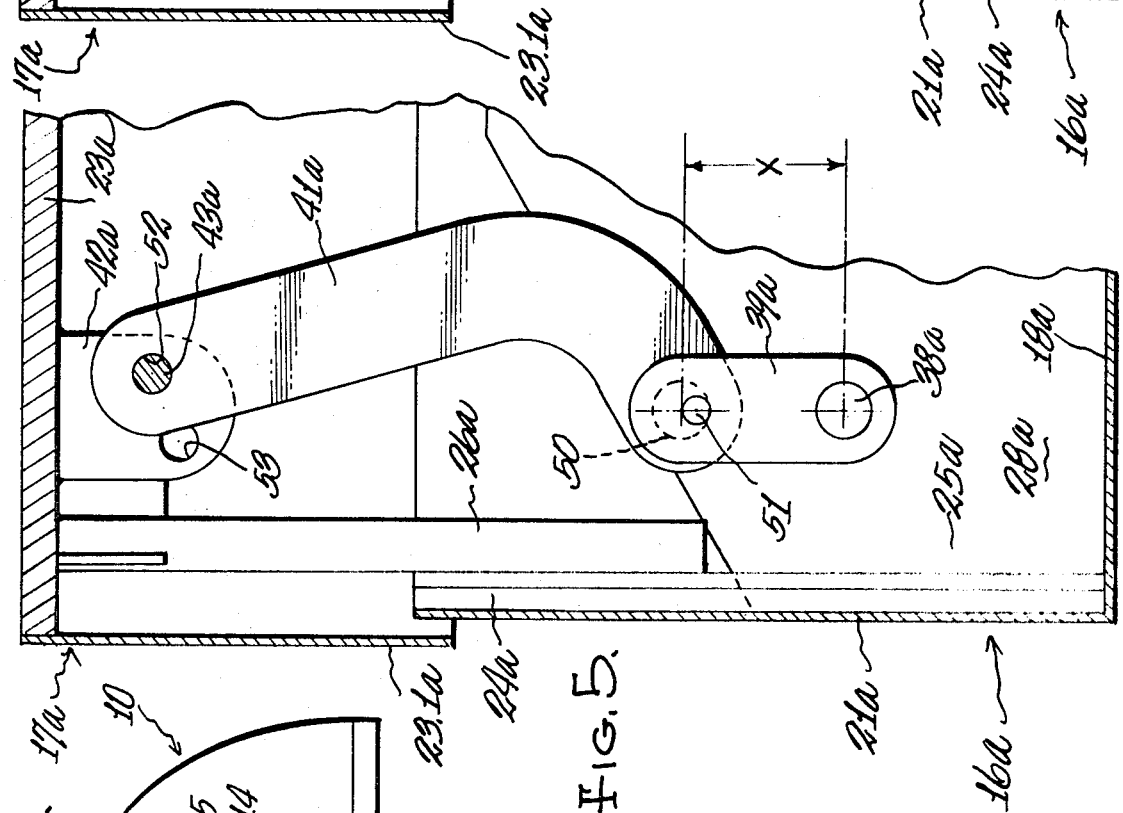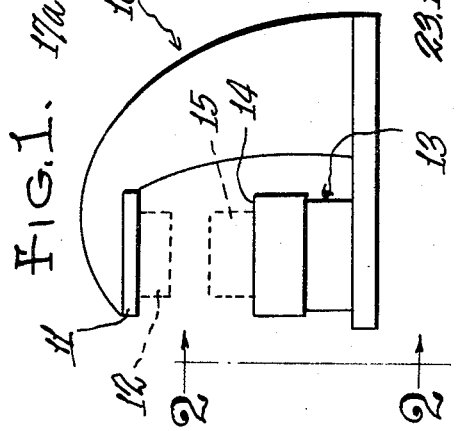

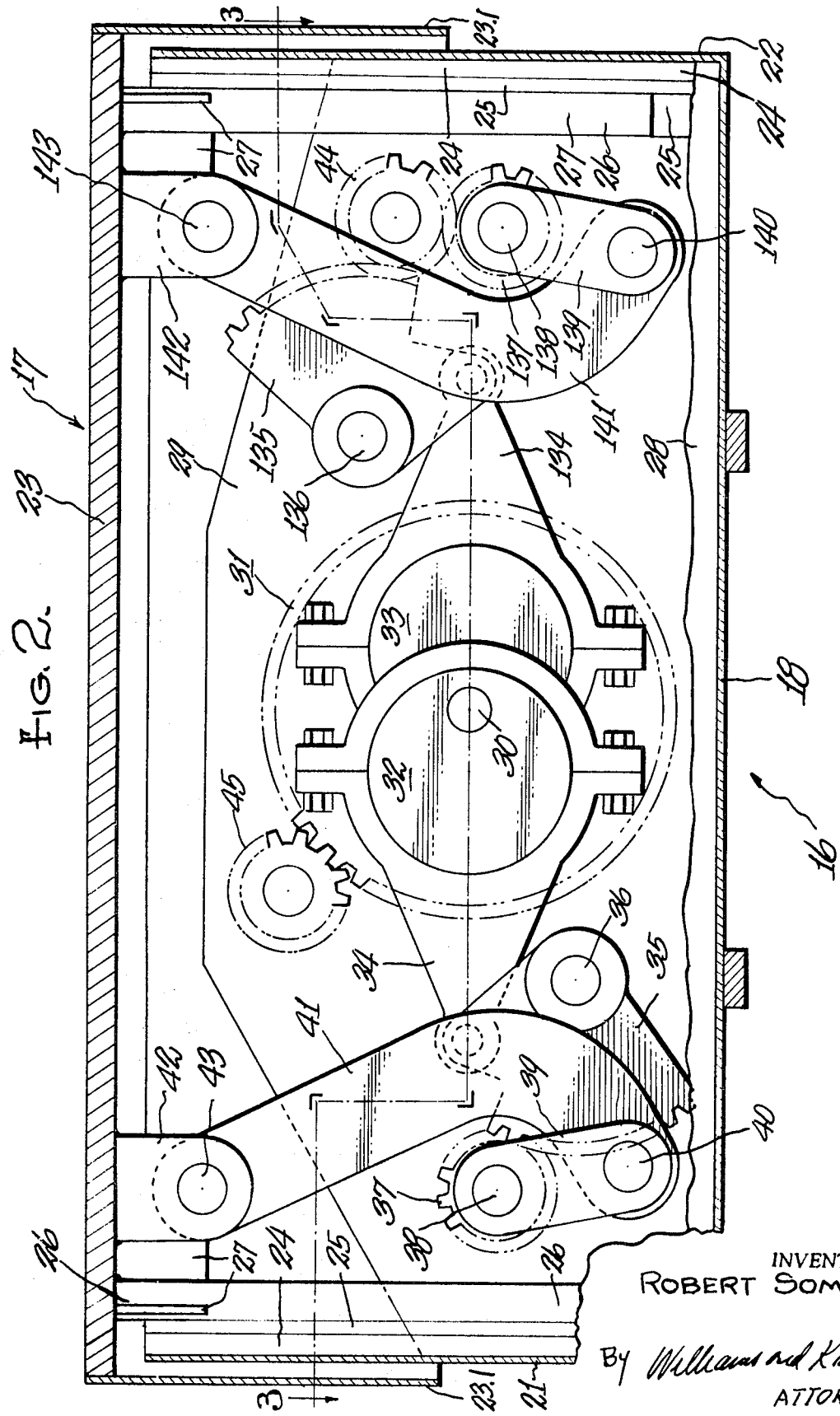

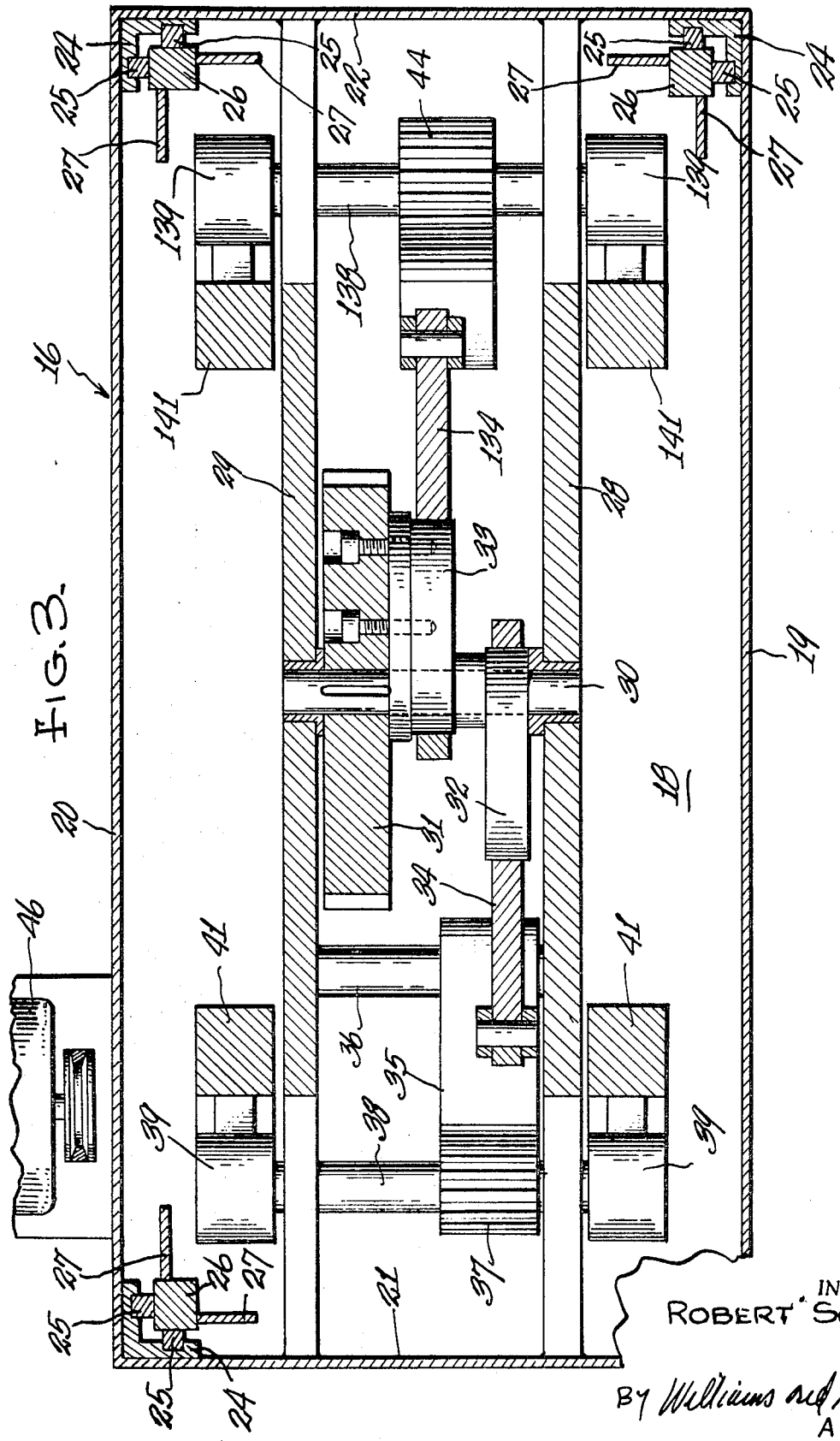

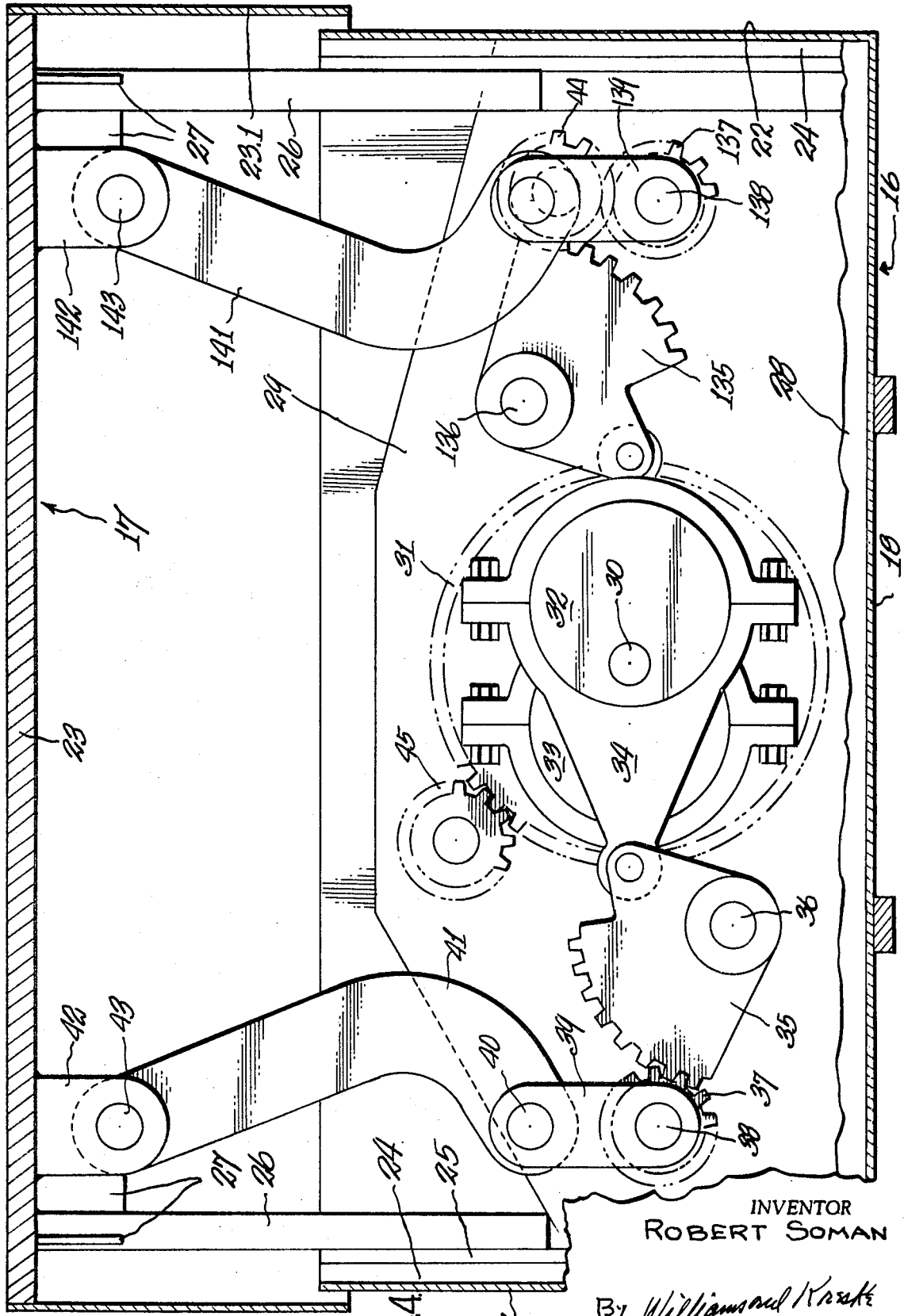

LIFT TABLE ASSEMBLY FOR A WELDING PRESS

BACKGROUND AND SUMMARY OF THE INVENTION

While welding presses having a fixed upper member and a vertically shiftable lower member forming a part of a removable assembly, which may be called a lift table, have long been known, such lift tables have not been entirely satisfactory since they lacked the long term dependability required of production line equipment, they have required considerable remote and costly mechanism, and accuracy of table operating movement has been difficult to achieve and retain under the usual operating conditions to which apparatus of the present type is subjected.

The present invention, by use of simple mechanism, makes each lift table assembly substantially self-contained with all the critical working parts enclosed whereby adequate lubrication can be provided with minimum risk of exposure of the working parts to dirt and other contaminants. By a novel arrangement of the working parts, maximum rigidity in a minimum working space is provided. Finally, by a novel arrangement of parts, means are provided for varying the amount of vertical movement of the lift table assembly without affecting one of the latter's extreme operating positions.

These and other advantages will readily become apparent from a study of the following description and from the appended drawings.

DRAWING DESCRIPTION

In the drawings accompanying this application and forming a part of this specification there is shown, for purpose of illustration, embodiments which the invention may assume, and in these drawings:

FIG. 1 is a generally diagrammatic elevational view of apparatus illustrating an environment in which the invention may find use, FIG. 2 is an enlarged, fragmentary elevational view generally corresponding to the line 2—2 of FIG. 1, parts on the near side being broken away to show the underlying structure, FIG. 3 is a sectional plan view generally corresponding to the line 3—3 of FIG. 2, FIG. 4 is a view similar to FIG. 2 but showing certain operating parts in another position, FIG. 5 is a fragmentary view similar to FIG. 4 but of another embodiment, and FIG. 6 is a view similar to FIG. 5 but with certain parts in another adjusted position.

DETAILED DESCRIPTION

With reference to FIG. 1, there is illustrated apparatus commonly used in the manufacture of automobiles, refrigerators and like products, and frequently known as a welding press. Such apparatus is herein shown to comprise a frame 10 supporting a fixed upper platen 11 to which is secured the upper portion 12 of a welding fixture assembly. Removably secured to the frame 10 beneath the fixed upper platen 11 is a lift table assembly 13 whose upper portion 14 is movable toward and away from the upper platen 11 and thus constitutes a vertically shiftable lower platen. Secured to the lift table assembly upper portion 14 is the lower portion 15 of the previously mentioned welding fixture assembly.

While it forms no part of the present invention, the welding fixture assemblies cooperably provide welding mechanisms which weld material disposed therebetween. Briefly, operation is normally as follows: With the welding fixture assemblies 12, 15 separated as seen in FIG. 1, material to be welded will be properly positioned therebetween. The lift table assembly 13 will then be actuated to raise its upper portion 14 to a predetermined position wherein the fixture assembly 15 is in cooperable relation with the fixture assembly 12 whereupon welding of the interpositioned material will occur. After welding of the material, the lift table portion 14 will be lowered to the position illustrated in FIG. 1 whereupon the now welded material will be removed from between the welding fixture assemblies and other material to be welded will be disposed therebetween for another operational cycle.

With reference next to FIGS. 2 and 3, the present invention is concerned with the structure of the lift table assembly 13 whose function has hereinabove been briefly described. As illustrated, the lift table is generally rectangular in plan (FIG. 3) and comprises a base structure 16 and an overlying top structure 17 (FIG. 2), forming the lift table portion 14 aforesaid. Base structure 16 comprises a floor 18 and spaced opposed side walls 19, 20 and end walls 21, 22. Each of the walls 19 through 22 is herein shown integral with respective adjoining walls and each is disclosed as being integral with the floor 18; however, it will be appreciated that any equivalent structure which provides a rigid, oiltight juncture therebetween could be employed. In the position of parts seen in FIG. 2, each of the walls 19–22 extends upwardly to termination just short of a plate 23 forming part of the top structure 17.

As best seen in FIG. 3, each corner of base 16 is provided with a coextensive, upstanding angle 24 in whose inwardly directed faces are inset elongated guide bars 25. Top plate 23, on the other hand, adjacent each of its corners, is provided with a depending post 26 braced with suitable gussets 27. The posts 26 are positioned for close sliding fit with respective guide bars 25 whereby the top structure will be accurately guided in its vertical movement relative to the base structure. It is an important feature that the angles 24 and the posts 26 are within the confines of the base structure wall 19–22 whereby they are protected from foreign matter and whereby they can be continuously supplied with lubrication by a suitable splash or pressure system which has, however, not been illustrated. To maintain the upper, open end of the base structure 16 closed, top plate 23 is provided with a peripheral, depending skirt portion 23.1 which, in cooperation with the base walls 19–22, provides a labyrinth type seal.

Turning now to the means for effecting vertical movement of the top structure 17 and still referring to FIG. 2 and 3, a pair of spaced-apart supports 28, 29 extend between the end walls 21, 22 and rotatably support a shaft 30. Keyed or otherwise affixed to the shaft 30 between the supports 28, 29 is a gear 31 and bolted or otherwise secured to such gear are a pair of eccentrics 32, 33 which are herein shown to be integral with each other. With respect to the axis of shaft 30, eccentrics 32, 33 are in opposed relation, each being offset the same amount from the axis of such shaft.

Rotatably secured to the eccentric 32 is a pitman 34 whose free end is pivotally secured to a gear segment 35 pivoted about the axis of a shaft 36 extending between the supports 28, 29. Gear segment 35 meshes with a gear 37 affixed to a shaft 38 extending between and through the supports 28, 29 and rotatably supported thereby. Affixed to the ends of shaft 38 are respective crank arms 39 having a pivot pin connection with the lower ends of respective links 41. The upper ends of links 41 are secured to the top structure plate 23 by means of respective ears 42 depending from the plate and respective pivot pins 43.

Since the parts associated with the eccentric 33 are similar to those associated with eccentric 32, they have been identified with the same reference characters as before but with the prefix "1" appended. It is believed that a detailed description of the parts 134 through 143 is unnecessary in view of the foregoing; however, it is to be noted that the gear segment 135 does not mesh directly with the gear 137 but instead meshes with a gear 44 in turn meshed with the gear 137. Gear 44 thus functions as a reverse idler gear for a purpose to be seen.

Meshed with the previously described gear 31, as seen in FIG. 2, is a drive pinion 45 adapted to be driven by a drive unit 46 (see FIG. 3) secured to the base structure 16. Because of space limitations, drive unit 46 is mounted outside of the base structure walls 19 through 22 and as herein disclosed, such unit may comprise a drive motor and a clutch brake.

With the thus described lift table assembly associated with the frame 10 and with the frame and the table assembly respectively mounting the welding fixture parts 12, 15, operation of the lift table will be as follows: FIG. 2 illustrates the lift table assembly in its lowermost position wherein material to be welded may be disposed between the welding fixture assemblies 12, 15. When the material to be welded has been placed between the welding fixture assemblies aforesaid, the lift table top structure 17 will be elevated to the position seen in FIG. 4 thus moving the lower welding fixture assembly 15 to cooperation with the upper welding fixture assembly 12.

To effect the aforesaid movement of the top structure 17, drive unit 46 will be actuated to rotate the gear 31 and the eccentrics 32, 33 one hundred eighty degrees from the position seen in FIG. 2 to the position seen in FIG. 4. During such eccentric movement, pitmans 34, 134 will simultaneously rotate respective gear segments 35, 135 about their pivots and, by virtue of the gear 37 on the one hand and the gears 44, 137 on the other hand, simultaneously rotate the crank arms 39, 139 counterclockwise and clockwise respectively, from their positions seen in FIG. 2 to their positions seen in FIG. 4. As the crank arms 39, 139 shift to their positions seen in FIG. 4, the links 41, 141 effect elevation of the top structure 17.

It is an important feature that since the crank arms 39, 139 swing inwardly of respective walls 21, 22, in their movement between the positions of FIGS. 2 and 4, the shafts 38, 138 and thus the links 41, 141 may be located closely adjacent respective base structure walls 21, 22 for maximum stability of the top structure.

It is another important feature that both the links 41, 141 and the pitmans 34, 134 have a harmonic motion imparted respectively by the crank members 39, 139 and the eccentrics 32, 33 and, since such harmonic motions are superimposed upon each other, the lift table top structure 17 will be brought to rest in the position of FIG. 4 with minimum shock.

After welding is completed, gear 31 will again be rotated one hundred eighty degrees by the drive unit 46 to the position of FIG. 2. This, as will readily be seen, returns the top structure 17 and the parts connected thereto to the position of FIG. 2 once again (crank arms 39, 139 this time respectively rotating in clockwise, counterclockwise directions) whereupon the now welded material may be removed from between the welding fixtures and other material to be welded disposed therebetween prior to initiation of another operational cycle.

It may at times be desirable to reduce the distance through which the top structure of the lift table assembly is reciprocated but without changing the position of such top structure at one of its travel extremes. For example and as fragmentarily seen in FIGS. 5 and 6 wherein corresponding parts are identified with the same reference characters as before but with the suffix "a" added, means may be provided for varying the distance through which the top structure 17a is reciprocated without changing the position of the top structure in the uppermost position illustrated.

With reference first to FIG. 5, the previously described pivot or crankpin 40 is replaced with a crankpin 50 having eccentric portions 51 mounted in its crank arm 39a. The arrangement is such that by rotating the crank pin 50 about its eccentric portions 51 from the position of FIG. 5 to that of FIG. 6, the throw of the crankpin; i.e. its radial spacing from the shaft 38a, is reduced from that of X (FIG. 5) to that of Y FIG. 6. Although not shown, any suitable structure will be provided for retaining the crankpin 50 in either of its adjusted positions illustrated.

Since mere shifting of the crankpin 50 as hereabove described would lower the uppermost position of the top structure, ears 42a are provided with vertically spaced apertures 52, 53 for reception of the link upper pivot pin 43a. For clearance purposes, such apertures are also horizontally offset from each other.

In the position of parts seen in FIG. 5, crankpin 50 is positioned for maximum stroke while pivot pin 43a extends through the aligned apertures 52 of the ears 42a and the aperture in the upper end of the link 41a. On the other hand and with the crankpin 50 positioned for minimum stroke as seen in FIG. 6, pivot pin 43a will extend through the aligned apertures 53 of the ears 42a and the aperture in the upper end of the link 41a. The vertical spacing between the apertures 52, 53, of course, will be equal to the radial shift of position of the crankpin 50 so that the uppermost position of the top structure 17a will be unaffected despite the radial change of position of the crankpin.

While only one of the links 41a and its associated parts are shown in FIGS. 5 and 6, it will be evident that each of the links and their associated parts previously described will similarly be arranged and while not shown in the drawings, any convenient means may be employed to releasably retain the pivot pins 43a in their selected positions.

I claim:

1. A lift table forming part of a welding press assembly, comprising
   a base structure including a floorlike member,
   a top structure overlying said base structure,
   link means extending between said base structure and said top structure for effecting vertical movement of the latter relative to said base structure,
   guide means in part provided by said base structure and in part provided by said top structure for guiding movement of the latter,
   upstanding wall means forming a part of said base structure and enclosing said guide means and said link means,
   said link means comprising a plurality of links pivotally secured to and depending from said top structure, the lower portion of each link being pivotally secured to crank means rotatably carried by said base structure,
   and means carried by said base structure and interconnecting said crank means for unitary rotation.

2. A lift table forming part of a welding press assembly, comprising
   a base structure including a floorlike member,
   a top structure overlying said base structure,
   link means extending between said base structure and said top structure for effecting vertical movement of the latter relative to said base structure,
   guide means in part provided by said base structure and in part provided by said top structure for guiding movement of the latter,
   upstanding wall means forming a part of said base structure and enclosing said guide means and said link means,
   said link means comprising a pair of spaced-apart links pivotally secured to and depending from said top structure and respectively disposed adjacent opposed portions of said wall means, and a pair of crank arms each swingable in an arcuate path between a first position wherein each extends upwardly of its rotational axis and a second position wherein each extends downwardly of its rotational axis, the lower portion of each of said links being pivotally secured to a respective crank arm,
   said crank arms in position intermediate said first and second positions extending toward each other and away from respective wall means portions to maximize the spacings between said link means with minimum spacing between said wall means opposed portions,
   and means carried by said base structure within said wall means and interconnecting said cranks for unitary movement.

3. The construction of claim 1 wherein said base structure is four-sided in plan,
   and wherein a link aforesaid is provided adjacent each base structure corner.

4. The construction of claim 3 wherein said links are arranged in pairs,
   wherein the links of one link pair are connected to crank means within said wall means rotatable about one axis and the links of the other link pair are connected to crank means within said wall means rotatable about another axis spaced laterally of said one axis, and wherein means within said wall means interconnects said crank means for unitary rotation about respective axes.

5. The construction of claim 4 wherein said crank means axes are provided by respective shafts,
wherein a pair of gear segments within said wall means have driving engagement with respective shafts,
wherein said gear segments are connected to respective eccentric journals by respective pitmans within said wall means,
wherein said eccentric journals are rotatable in unison about a drive axis disposed between said shaft axes,
and wherein a drive motor is mounted on said base structure and effects rotation of said eccentric journals about said drive axis.

6. The construction of claim 1 wherein said crank means provides a crankpin offset radially of an axis and movable in an arcuate path thereabout,
wherein said links have pivotal connection with said top structure,
wherein said crankpin is eccentrically mounted to provide for shifting its radial position relative to the axis about which it is movable to thereby vary the distance through which said top structure is reciprocated,
and wherein each link pivotal connection comprises a pivot pin selectively positionable through apertures closely receiving the same and spaced apart an amount equal to the radial shift in position of said crank pin whereby said top structure predetermined position is unaffected by the aforesaid shift in radial position of said crankpin.

7. In a welding press having a platen reciprocable toward and away from a fixed platen, said platens being adapted to carry cooperating parts of a welding fixture whereby said movable platen is required to have a predetermined spaced relation with respect to said fixed platen at the end of its stroke toward the latter, the improvement comprising;
a crank arm having one end connected to a rotatable shaft which is disposed transverse to the line of stroke of said movable platen whereby its opposite end is movable in a circular path about the axis of said shaft,
a crankpin fixed to a pivot pin at said other end of said crank arm, said crankpin being offset radially of the axis of said pivot pin,
link means having one end pivotally connected to said crankpin and its opposite end pivotally connected to said movable platen for translating circular movement of said crank arm to reciprocatory movement of said movable platen,
said crankpin being adjustable to various positions radially of said pivot pin axis to thereby vary the distance between it and the crank arm shaft and thus vary the stroke of said movable platen,
and means for adjusting the pivotal connection between said movable platen and said link means in a direction toward and away from said movable platen an amount corresponding and equal to the adjustment in the radial position of said crankpin whereby said predetermined spaced relation between said fixed and movable platens is unaffected by the radial adjustment of said crankpin.

8. The construction according to claim 7 wherein the pivotal connection between said link means and said movable platen comprises an ear depending from the latter and having a pair of openings, one closer to said fixed platen than the other, and a pivot pin on said link means and disposed within a selected one of said pair of openings.